(12) United States Patent
Winkel et al.

(10) Patent No.: US 7,396,314 B2
(45) Date of Patent: Jul. 8, 2008

(54) METHOD AND DEVICE FOR ACTIVELY REDUCING CLUTCH GRABBINGS IN A MOTOR VEHICLE

(75) Inventors: Matthias Winkel, Weingarten (DE); Thomas Jäger, Meckenbeuren (DE); Rupert Kramer, Friedrichshafen (DE); Horst Aepker, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 166 days.

(21) Appl. No.: 10/527,874

(22) PCT Filed: Sep. 16, 2003

(86) PCT No.: PCT/EP03/10276

§ 371 (c)(1),
(2), (4) Date: Mar. 16, 2005

(87) PCT Pub. No.: WO2004/028849

PCT Pub. Date: Apr. 8, 2004

(65) Prior Publication Data

US 2005/0261109 A1    Nov. 24, 2005

(30) Foreign Application Priority Data

Sep. 21, 2002   (DE)   ................ 102 44 026

(51) Int. Cl.
*B60W 30/20*    (2006.01)
(52) U.S. Cl. ................. 477/77; 477/174

(58) Field of Classification Search ........... 477/77, 477/3, 83, 101, 102; 475/153, 2; 701/64
See application file for complete search history.

(56) References Cited

U.S. PATENT DOCUMENTS 3,701,499 A * 10/1972 Schubert et al. ......... 244/17.27

(Continued)

FOREIGN PATENT DOCUMENTS

DE    195 38 784 A1    5/1996

(Continued)

OTHER PUBLICATIONS

Albers, Prof. Dr. Ing. Albert and Dipl. Ing. Daniel Herbst, "RupfenUrsachen und Abhilfen", 6. LuK-Kolloquium, 1998, pp. 23-46.

(Continued)

*Primary Examiner*—Sherry Estremsky
*Assistant Examiner*—Edwin A Young
(74) *Attorney, Agent, or Firm*—Davis Bujold & Daniels, P.L.L.C.

(57) ABSTRACT

A method and a device with which disturbing vibrations are diminished at least in the height of their amplitude. A control and regulating device (24) and suitable sensors (34, 36, 41) activate a device (7, 11, 15, 23, 29, 30) when previously established limiting values are exceeded with regard to procedure, with which components of the motor vehicle are influenced such that the disturbing vibrations are damped or compensated.

15 Claims, 1 Drawing Sheet

U.S. PATENT DOCUMENTS

| | | |
|---|---|---|
| 4,343,387 A | 8/1982 | Hofbauer |
| 4,656,883 A | 4/1987 | Bengtsson |
| 5,725,456 A | 3/1998 | Fischer et al. |
| 5,964,509 A | 10/1999 | Naito et al. |
| 6,050,652 A | 4/2000 | Kolbe et al. |
| 6,314,342 B1 | 11/2001 | Kramer et al. |
| 6,736,754 B2 | 5/2004 | Davids et al. |
| 6,969,338 B2 * | 11/2005 | Dreibholz et al. ............. 477/77 |
| 2002/0047417 A1 | 4/2002 | Tebbe |
| 2002/0177504 A1 * | 11/2002 | Pels et al. ...................... 477/3 |
| 2003/0125850 A1 * | 7/2003 | Evans et al. ................... 701/22 |

FOREIGN PATENT DOCUMENTS

| | | |
|---|---|---|
| DE | 195 32 136 A1 | 3/1997 |
| DE | 195 32 163 A1 | 3/1997 |
| DE | 100 35 521 A1 | 2/2002 |
| DE | 100 40 127 A1 | 2/2002 |
| DE | 100 41 387 A1 | 3/2002 |
| DE | 101 21 389 C1 | 8/2002 |
| EP | 0 845 616 A2 | 6/1998 |
| FR | 2 598 765 | 11/1987 |
| GB | 2 346 351 A | 8/2000 |
| WO | WO-01/56827 A1 | 8/2001 |

OTHER PUBLICATIONS

"Prüfen von Antriebssträngen am Beispiel des Kupplungsrupfens—Ganzheitliche Antriebsstrangentwicklung", *ATZ Automobiltechnische Zeitschrift* 103 (2001), pp. 44-49.

* cited by examiner

METHOD AND DEVICE FOR ACTIVELY REDUCING CLUTCH GRABBINGS IN A MOTOR VEHICLE

This application is a national stage completion of PCT/EP 2003/010276 filed Sep. 16. 2003 which claims priority from German Application Serial No. 102 44 026.3 filed Sep. 21, 2002.

FIELD OF THE INVENTION

In motor vehicles, vibrations can occur during the slippage phase of a clutch in the power train, which are generated in the motor vehicle clutch. As can be gathered from the technical article, "Testing Power Trains as Exemplified by Clutch Grabbing: Whole Power Train Development," ATZ Automobile Engineering Journal 103 (2001) 44 ff., these vibrations arise when periodic torques are generated in connection with a slipping clutch, which torques lie in the characteristic frequency of the power train dynamically separated by the clutch.

BACKGROUND OF THE INVENTION

These vibrations, also known as clutch grabbing, can be self-excited or automatically excited. Self-excited clutch grabbing is caused by a drop of the clutch facing friction value in relation to the rate of sliding and can be rather considerable as a function of the power train overall damping.

Automatically excited clutch grabbing is in contrast stimulated by external sources in relation to the friction partners, including crankshaft axial vibrations or parallel deviations on the clutch pressure plate, in combination with an angular offset between the clutch pressure plate and the clutch disk that supports the friction lining.

The torsional vibrations that arise in the power train in connection with clutch grabbing are converted by the driven motor vehicle wheels into longitudinal oscillations of the entire motor vehicle and are transmitted via the service elements and via the motor vehicle seats to the motor vehicle occupants. Thus clutch grabbing is perceived by the vehicle passengers as unpleasant vibrations or oscillations that can also be associated with noise stress.

Although a high-level damping in the components of the power train does reduce the oscillation amplitudes with automatically excited clutch grabbing, this is nonetheless often an unrealistic demand due to the general wish for the lowest possible fuel consumption for a motor vehicle, since a permanently high damping in the power train is basically attainable only through a constantly active elevation of friction losses, for example in the transmission, in the bearings and in the seals.

Inserting a clutch friction lining with an increasing friction value curve over the rate of sliding has been proposed, for example, as a countermeasure for reducing clutch grabbing and the disturbing longitudinal oscillations of the motor vehicle that go along with it. The friction linings available at this time, however, are not capable of this.

Another possibility for reducing clutch grabbing consists in further reducing the manufacturing tolerances in the clutch region, however this would be possible only with a very high manufacturing expenditure, and it will produce a rather modest contribution to reducing clutch grabbing ("Grabbing-Causes and Remedies," Prof. Albert Albers, Dr. Eng., Daniel Herbst, Cert. Eng. in: 6$^{th}$ LuK Colloquium, 1998).

Metrological recording of a clutch jerking in connection with a starting clutch or a converter bridging clutch by means of suitable sensors and a control and regulating device as well as active measures for ending this clutch jerking are moreover known from EP 845 616 A2. These measures consist of altering the ignition time of an internal combustion engine connected with the clutch via drive engineering in order thus to act upon the input torque into the clutch. Another measure provides for increasing the contact pressure of the clutch pressure plate on the clutch friction lining, whereby a slippage operation of the clutch offering some advantages is no longer possible.

Since the known measures bring on unsatisfactory results with respect to avoiding or reducing clutch grabbing, the object of the invention consists in presenting a method and device with which the disturbing rotational vibrations of the power train or the disturbing longitudinal oscillations can at least be diminished in their amplitude height.

The accomplishment of this objective is disclosed in the characterizing features of the method and device main claims, while advantageous further developments and refinements of the invention can be inferred from the dependent claims.

SUMMARY OF THE INVENTION

With respect to the method of the invention, it is accordingly provided that the disturbing vibrations are recognized and evaluated by a control and regulating device using suitable sensors. If previously established limiting values are exceeded, then the control and regulating device acts upon at least one motor vehicle device such that by its activation, the disturbing vibration in the power train and/or in the entire motor vehicle is completely eliminated or at least damped in its amplitude. For this purpose, a rotating component of the motor vehicle power train is acted upon by the control and regulating device via the at least one motor vehicle device such that the rotating component or components are continuously or periodically braked in their rotational motion or are stimulated to a compensatory vibration.

In this connection, it is provided that the at least one device acts on at least one motor vehicle component such that a longitudinal oscillation of the overall motor vehicle stimulated by the vibrations in the power train is eliminated or at least damped in its amplitude height. To generate a compensatory vibration that will damp the disturbing vibrations in the power train or in the entire motor vehicle, at least in their amplitude, or for a damping braking intervention on rotating components in the power train, this compensatory vibration or the brake intervention has the same or a similar frequency and a vibration phase offset in relation to the vibration that is acting in a disturbing manner. This vibration phase offset leads to a mutual compensation of the vibration amplitudes.

In a refinement of the method of the invention, it can be provided that a starting or gear box of the motor vehicle transmission is actuated by the control and regulation device such that its torque transmission capacity oscillates with the frequency of the disturbing vibration and has the mentioned vibration phase offset in relation to this, due to which the amplitude of the disturbing vibration is reduced to a predetermined value.

In another variant of the control method, it is provided that a service brake acting on the input shaft of a transmission is actuated by the control and regulating device such that, with a rise in the vibration amplitude of the disturbing vibration, the service brake brakes the transmission input shaft to a rotational speed that reduces the amplitude of the disturbing vibration to a predetermined value that does not have a disturbing action. Such a control method is especially appropriate for use in power trains in which the transmission is constructed as an automatic or automatically shiftable claw shift transmission.

In motor vehicles in whose power train an abrasion-free permanent brake (for example, an electromagnetic retarder arranged behind the transmission in terms of drive engineering) is inserted, this permanent brake can be actuated via the control and regulation device such that, with a rise in the vibration amplitude of the disturbing vibration, the permanent brake brakes the rotational speed of the wheel drive shafts of the motor vehicle to the extent that the amplitude of the disturbing vibration is reduced to a predetermined value.

Another variant of the method of the invention provides that the service brakes of the driven motor vehicle wheels are actuated by the control and regulating device such that here too, with a rise in the vibration amplitude of the disturbing vibration, the motor vehicle wheels are slowed down to a rotational speed through which the rotary or longitudinal oscillation disturbing the amplitude is reduced to a predetermined value.

It is also possible to act upon an output actuator of the motor vehicle internal combustion engine via the control and regulating device. For this, the rotational speed of the internal combustion engine is altered in accordance with the method in the event of a perceived rise in the vibration amplitude of the disturbing vibration such that this is oscillated with the frequency of the harmful vibration, however its phase displacement to this is such that the amplitude of the disturbing vibration is reduced to a predetermined and not disturbing value.

Such an operating behavior of the internal combustion engine is especially appropriate if the clutch grabbing described at the beginning occurs while switching the motor vehicle. The control and regulating device here regulates the rotational speed of the internal combustion engine when clutch grabbing occurs, so that during one of these known switching travels, the switching rotational speed (for example, the idling rotational speed) of the internal combustion engine is increased such that the amplitude of the disturbing vibration is reduced to a predetermined value. The switching rotational speed can for this purpose be increased at once or in stages until the vibration compensation is attained.

If there is a double clutch transmission present in the power train of the motor vehicle, the two clutches can be used to influence the disturbing vibrations such that, upon recognizing the clutch grabbing, the second clutch is activated in a controlled manner by the control and regulating device with respect to its torque transfer capacity in addition to the first clutch (which is closed for the gear step set) as frequently and as long, until the amplitude of the disturbing vibration is reduced to a predetermined value. In this way, the periodic opening and closing of the second clutch of the double clutch transmission will preferably take place with the same frequency that the disturbing frequency has, but will nonetheless have a vibration phase offset in relation to this through which the vibration amplitudes will at least be largely compensated.

In another refinement of the control method of the invention, it can be provided that, in a power train with a gear box, its synchronization device is activated in a braking manner in the region of a not just shifted transmission step as frequently and as long as it takes until the amplitude of the disturbing vibration is reduced to a predetermined value.

Finally, it should be mentioned that the control and regulating device can record the rotational speeds of the clutch input side and the clutch output side in implementing its control and regulation objectives described above with the aid of rotational speed sensors, and the longitudinal acceleration of the motor vehicle is ascertainable with the aid of a longitudinal acceleration sensor which can, for example, be arranged in the region of a motor vehicle seat.

With respect to the device for implementing the control and regulation functions described, first of all a control and regulating device is arranged in the motor vehicle, which is preferably designed as a microcomputer. The microcomputer can moreover be a transmission or motor control device, for example. This control and regulation device is connected with the sensors for recording disturbing vibrations in the vehicle via sensor lines. The control lines in contrast lead to devices in the power train with which motor vehicle parts can be set into vibration or braked such that their frequency, vibration amplitude and phase angle in relation to the frequency, vibration amplitude and phase angle of the disturbing vibration leads to a damping of the amplitude of the disturbing vibration when these two vibrations are superimposed.

Rotational speed sensors that, for example, record the rotational speed of the input side or the output side of a clutch, preferably a starting clutch or gearbox or other rotating parts in the power train, belong to the sensors mentioned. Moreover the control and regulating device is preferably connected to a vibration sensor that can sense a disturbing vibration in the power train or in the motor vehicle overall. Preferably longitudinal oscillations of the entire motor vehicle in the region of the motor vehicle seat can be recorded with such a sensor as mentioned in the description of the method.

In a further refinement of the device of the invention, it is provided that the control and regulating device is connected to a control device for activation of the clutch via a control line. Through this construction, the clutch can be stimulated to the desired compensatory vibration behavior preferably independently of a conventional clutch activation device. Or, for example, a clutch pressure plate can be periodically or continuously subjected to contact pressure with a higher contact pressing force on the friction lining of the clutch disk.

Moreover, it can be provided with respect to the device of the invention that the control and regulating device is connected to an actuator for activation of a synchronization device in an automated or automatic gearbox via a control line. Such an actuating device can be a hydraulically or pneumatically activatable piston-cylinder arrangement with which a clutch sleeve arranged in the transmission on a transmission shaft is axially displaceable. This clutch sleeve acts in an inherently known manner on axially displaceable synchronizing rings with the help of which a loose wheel can be engaged on the transmission shaft in the torque transmission path such that it can be braked.

In implementing the method of the invention, it can also be provided that the control and regulating device is connected to the actuating device of a service brake for braking an input shaft of a gearbox, preferably an automated claw clutch transmission, via a corresponding control line. In accordance with the method, this service brake is then periodically or continuously activatable independently of its synchronization objectives in connection with a gear shifting for slowing down the transmission input shaft and therewith for reducing the disturbing vibrations.

In another refinement of the device for implementing the control and regulation method of the invention, it is provided that the control and regulation device is connected to a retarder device, thus with an abrasion free permanent brake for braking the drive shaft of the motor vehicle drive wheels via a control line. In the end, the control and regulation method of the invention can also be conducted with a device in which the control and regulation device is connected to actuators on the service brakes of the driven motor vehicle wheels via control lines. Through a corresponding brake intervention by the retarder or by the service brake on the driven motor vehicle wheels, although the occurrence of unfavorable rotary vibrations on the clutch cannot be avoided, with such a measure the damping of the drive train can be periodically increased or constantly increased for the period the clutch grabbing occurs so that the amplitudes of the disturbing vibrations are not unpleasantly high.

Finally, it can be provided that the control and regulating device is connected to a rotational speed adjustment device, thus for example with the output actuator of the internal combustion engine, via a control line. The desired result can also be attained through the procedural influencing of the motor rotational speed.

BRIEF DESCRIPTION OF THE DRAWINGS

The invention will now be described, by way of example, with reference to the accompanying drawings in which.

DETAILED DESCRIPTION OF THE INVENTION

Figure 1:
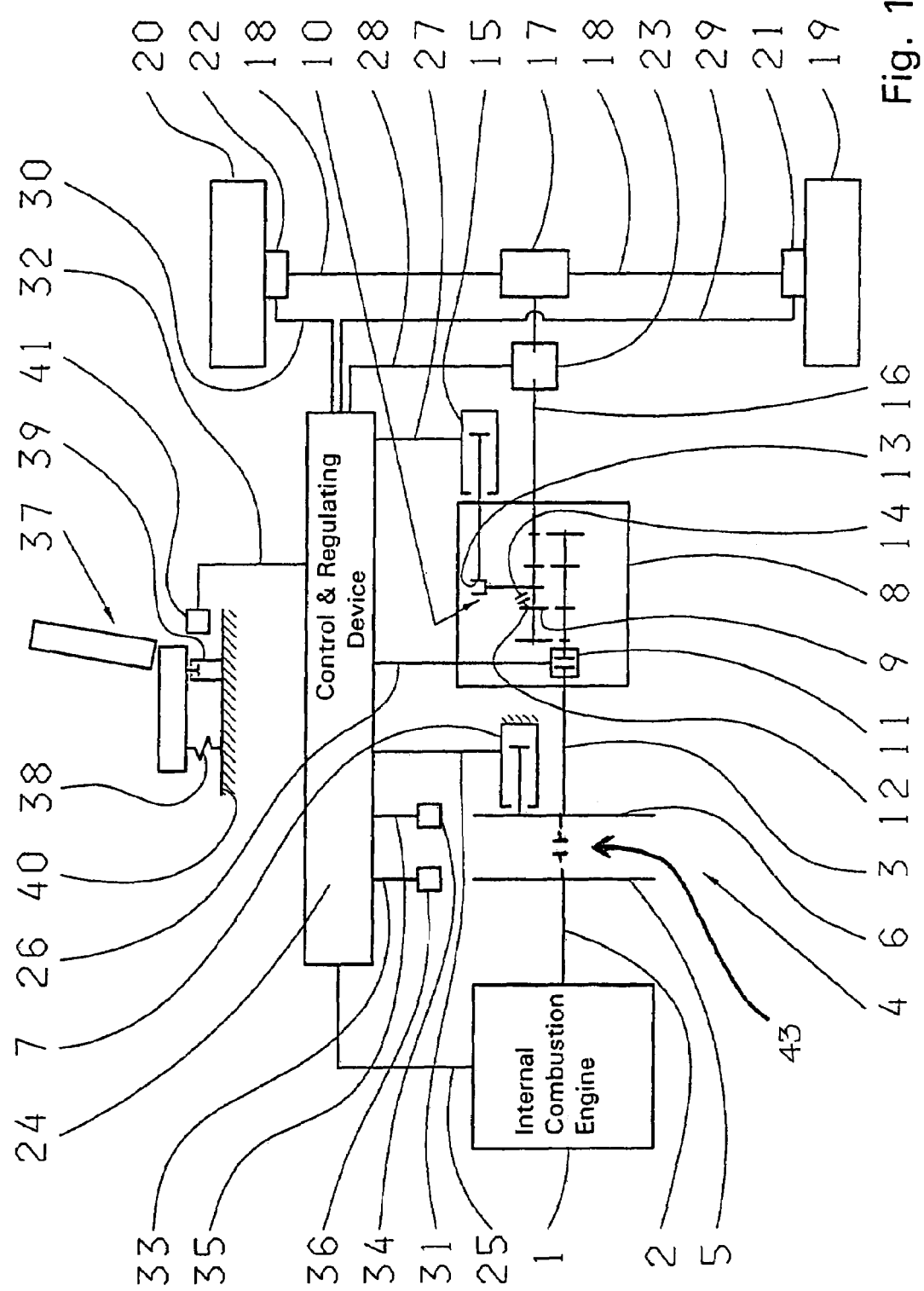
FIG. 1 is a schematic representation of a drive train of a motor vehicle as well as a large number of variants of the device of the invention.

In this drive train an internal combustion engine 1 can be connected as is inherently known with a gear box 8 via drive engineering through a starting clutch 4. For this the clutch 4 has an input side 5, which is connected to the crankshaft 2 of the internal combustion engine 1, as well as an output side that stands in connection with the input shaft 3 of the transmission 8. The output shaft 16 of this transmission 8 drives a differential transmission 17 via an abrasion-free permanent brake 23, thus for example an electromagnetically operating retarder, from which two drive shafts 18 for motor vehicle wheels 19, 20 proceed.

Service brakes 21, 22 are arranged on the motor vehicle wheels 19, 20, which can be constructed as drum or disk brakes. Moreover a control and regulation device 24 is represented, which preferably includes a microcomputer and can be an integral component of a motor or transmission control apparatus.

Finally, this Figure illustrates a motor vehicle seat 37 as a final motor vehicle main component on which a motor vehicle occupant can perceive vibrations in the motor vehicle. The motor vehicle seat 37 is physically fastened on the motor vehicle floor 40 via a spring damping system, which is here indicated by a spring 38 and a damping piston 39, for transmission of the vibrations generated by the drive train in this simplified representation.

As was explained at the beginning, rotary vibrations arising in the motor vehicle clutch 4 in certain operating phases, as for example during the switching operation of the motor vehicle, extend over all main components of the drive train to the motor vehicle wheels 19, 20 where these rotary vibrations are converted to longitudinal oscillations and are introduced into the motor vehicle body via the wheel suspension. These longitudinal oscillations are perceived as unpleasant by the driver situated on the motor vehicle seat 37 so that the measures of the invention are required to reduce these vibrations at least to a tolerable level.

For this it is first of all necessary to establish the rotary vibrations in the drive train or the longitudinal oscillations of the body resulting from them via corresponding sensors and to communicate them to the control and regulation device. For this purpose, two alternate types of sensors are represented in this drawing, which can be used individually or jointly. Thus one rotational speed sensor 34, 36 is respectively arranged on the input side 5 and on an output side 6 of the clutch 4, with which the clutch rotary vibrations of the clutch 4 that characterize grabbing can be established. This rotational speed information can be forwarded via sensor lines 33, 35 to the control and regulation device 24. The rotational speed values that characterize the disturbing rotary vibrations can, however, also be metrologically ascertained on all other rotating parts of the drive train.

Another possibility for sensing the disturbing vibrations in the motor vehicle consists, for example, in arranging a vibration sensor 41 in the region of the motor vehicle seat 37 for recording motor vehicle longitudinal oscillations, which sensor is connected to the control and regulating device 24 mentioned through a separate sensor line 32.

Once the control and regulation device 24 has determined, on the basis of the sensor information mentioned, that the rotary vibrations ascertained on the clutch 4, for example, and/or the longitudinal oscillations occurring on the motor vehicle body exceed a predetermined amplitude limiting value stored in the control and regulation device, countermeasures are taken which basically all serve to reduce the amplitude of the disturbing vibration (motor vehicle longitudinal oscillation or rotary vibration in the drive train) to the extent that these are preferably reduced below the perception threshold of a motor vehicle occupant situated on the motor vehicle seat. This is attained in that at least one device on or in the drive train of the motor vehicle acts on at least one component in the motor vehicle drive train such that the latter is continuously or periodically braked in its rotary motion or is stimulated to a vibration so that the vibration amplitude of the disturbing vibration is reduced.

A first variant for conducting this control and regulating method can be technically realized in that there is active influence upon a rotating component of the clutch 4 using an actuating device 7, here a piston-cylinder arrangement, such that the disturbing rotary motion of the clutch 4 is damped. The actuating device 7 is connected with the output side 6 of the clutch 4 in this exemplary embodiment of the invention. The direction of action of the piston-cylinder arrangement 7 is moreover preferably oriented in or against the direction of rotation of the clutch component 6, even though an axial action upon the clutch 4 can also be appropriate. The piston-cylinder arrangement 7 receives the activation signal through a driving power 31 of the control and regulation arrangement 24.

In another refinement of the invention, a service brake 11 can be used to reduce the disturbing vibrations present in the drive train. Such a service brake 11 is, as a rule, provided anyway in automated claw gear transmissions 8 in order with its aid to brake down the rotational speed of the transmission input shaft 3 to the synchronizing rotational speed of the higher gear in up-shifting processes. This service brake 11 can, however, also be independently activated or deactivated of such shifting synchronization objectives by the control and regulation device 24 for this to reduce the disturbing rotary vibrations of the clutch grabbing to an extent that is tolerable to the rider. Thus this service brake 11 can, for example, be closed momentarily if the control and regulating device 24 determines a rising flank of the drive train rotary motion or the motor vehicle longitudinal motion mentioned. The amplitude of the disturbing vibrations is reduced in this way.

The braking effect described can also be obtained in connection with completely synchronized transmissions in that step synchronization means of an unshifted gear are, likewise, activated when the control and regulating device 24 determines a rising slope of the drive train rotary vibration or the motor vehicle longitudinal oscillation. In this way, the amplitude of the disturbing vibrations is damped. A synchronization device 10 is provided in the transmission 8 in the schematic drawing explained here in which a clutch sleeve 13 arranged torsionally resistant, but axially displaceable on the transmission output shaft 16, interacts with a synchronizing ring 14 whose inclined synchronizing surface is pressed during an axial displacement on the transmission output shaft 16 against a synchronizing incline 12 of a toothed wheel 9 arranged on this shaft 16. The clutch sleeve 13 is axially moved by an actuating device 15 (piston-cylinder arrangement) on the transmission output shaft 16, wherein the actuating device 15 receives its actuating commands via a control line 27 from the control and regulating device 24. Here the toothed wheel 9 is at least temporarily connected torsion resistant with the transmission output shaft 16 which exerts a braking and rotary vibration damping action on the drive train downstream.

Furthermore the FIGURE shows that the abrasion-free service brake (retarder) 23, which is arranged in accordance with drive engineering behind the transmission 8, can also be used for damping rotary vibrations by braking a drive train shaft, for example a cardan shaft. With the rapidly reacting retarder 23, the latter can also be used for generating a compensatory vibration in which the phase angle of the compensatory vibration is displaced in relation to the phase angle of the disturbing rotary vibration in the drive train such that the overlapping vibrations at least partially cancel each other out.

The effect described can also be attained by a corresponding activation of the service brakes 21, 22 of the driven motor vehicle wheels 19, 20 which, likewise, takes place according to the aforementioned control rules. It is particularly advantageous with this technical solution that no additional actuators on the service brakes 21, 22 are needed, but available electro-hydraulic brake actuating devices can be actuated via control lines 29, 30 by the control and regulation device 24.

Moreover, the internal combustion engine 1 can also be controlled and regulated with regard to its motor rotational speed by the control and regulating device 24 via a control line 25, such that a motor rotational speed vibration with identical frequency is built up when the control and regulating device 24 determines a rising curve of the aforementioned drive train rotary vibration and the motor vehicle longitudinal oscillation. The grabbing vibration is then damped by the then different rotational speed differences on the clutch.

The disadvantage with this method is that a sawtooth pattern is contained over the course of time of the motor rotational speed, however it is felt to be significantly less disadvantageous by a motor vehicle occupant than the grabbing vibrations described.

It can also be provided that the control and regulation device 24 disposes of suitable resources for determining a switching operation of the motor vehicle. In such an operating case, the switching rotational speed of the internal combustion engine is raised by the control and regulation device 24 when the clutch grabbing occurs. This can take place step by step by corresponding signals through the control line 25, for example, to the power actuator of the internal combustion engine 1. This internal combustion motor-related damping of the grabbing vibration is also advantageous because no additional actuator equipment is necessary for this.

Finally, in the interest of completeness, it should be pointed out that even with a power train with a double clutch transmission 43, a damping of the clutch grabbing vibrations can be attained in that, using the clutch actuator of the second transmission clutch, the latter can be momentarily, periodically closed at least partially with the already mentioned phase offset in order to reduce the amplitude of the disturbing vibration by the braking action so triggered.

The method of the invention and the device of the invention for conducting the aforementioned method can include individual or even several of the different method and device refinements.

In addition to the sensors represented, other rotational speed sensors can be used in the drive train whose signals yield the necessary information through a corresponding conversion in an electronic unit.

| Reference numerals | |
|---|---|
| 1 | internal combustion engine |
| 2 | crankshaft |
| 3 | transmission input shaft |
| 4 | clutch |
| 5 | input side of the clutch |
| 6 | output side of the clutch |
| 7 | actuating device, piston-cylinder arrangement |
| 8 | transmission |
| 9 | toothed wheel |
| 10 | synchronization device |
| 11 | service brake |
| 12 | synchronization incline |
| 13 | clutch sleeve |
| 14 | synchronizing ring |
| 15 | actuating device, piston-cylinder arrangement |
| 16 | transmission output shaft |
| 17 | differential transmission |
| 18 | drive shafts of the driven motor vehicle wheels |
| 19 | motor vehicle wheel |
| 20 | motor vehicle wheel |
| 21 | service brake |
| 22 | service brake |
| 23 | retarder, permanent brake |
| 24 | control and regulating device |
| 25 | control line |
| 26 | control line |
| 27 | control line |
| 28 | control line |
| 29 | control line |
| 30 | control line |
| 31 | control line |
| 32 | sensor line |
| 33 | sensor line |
| 34 | rotational speed sensor |
| 35 | sensor line |
| 36 | rotational speed sensor |
| 37 | motor vehicle seat |
| 38 | spring |
| 39 | damping piston |
| 40 | motor vehicle floor |
| 41 | vibration sensor |

The invention claimed is:

1. A method for reducing disturbing vibrations in a motor vehicle comprising the steps of:
   determining the frequency, vibration amplitude and phase angle of a disturbing vibration by a control and regulating device using suitable sensors;
   generating a compensatory vibration having substantially the same frequency and amplitude as the disturbing vibration and a vibration phase offset relative to the disturbing vibration in one of a starting clutch and gear box in a drive train of the motor vehicle;
   applying the compensatory vibration to at least one rotating component in a motor vehicle drive train with one of the starting clutch and gear box such that a component or components of the drive train is/are continuously or periodically braked in rotary motion when the disturbing vibrations occur or is/are excited to the compensatory vibration; and actuating one of the starting clutch or gear box in the drive train by the control and regulating device such that torque transmission capacity oscillates with the frequency of the disturbing vibration and has the vibration phase offset in relation to the disturbing vibration through which the amplitude of the disturbing vibration is reduced to a predetermined value.

2. A method for reducing disturbing vibrations in a motor vehicle comprising the steps of:

determining the disturbing vibrations by a control and regulating device using suitable sensors;

activating at least one device when previously established limiting values are exceeded by the control and regulating device such that an amplitude of the disturbing motion is completely eliminated or at least damped;

influencing at least one rotating component in a motor vehicle drive train with the at least one device such that a latter component or components is/are continuously or periodically braked in rotary motion when the disturbing vibrations occur or is/are excited to a compensatory vibration; and braking an input shaft of the drive train by applying a service brake actuated by the control and regulating device such that with a rise in the vibration amplitude of the disturbing vibration, the service brake brakes the transmission input shaft to a rotational speed that reduces the amplitude of the disturbing vibration to a predetermined value.

3. A method for reducing disturbing vibrations in a motor vehicle comprising the steps of:

determining the frequency, vibration amplitude and phase angle of a disturbing vibration by a control and regulating device using suitable sensors;

generating a compensatory vibration having substantially the same frequency and amplitude as the disturbing vibration and a vibration phase offset relative to the disturbing vibration in an abrasion-free permanent brake in a drive train of the motor vehicle;

applying the compensatory vibration to at least one rotating component in a motor vehicle drive train with the abrasion-free permanent brake such that a latter component or components is/are continuously or periodically braked in rotary motion when the disturbing vibrations occur or is/are excited to a compensatory vibration; and arranging the abrasion-free permanent brake actuated by the control and regulating device behind the transmission such that with a rise in the vibration amplitude of the disturbing vibration, the permanent brake brakes a rotational speed of wheel drive shafts such that the amplitude of the disturbing longitudinal oscillation is reduced to a predetermined value.

4. A method for reducing disturbing vibrations in a motor vehicle comprising the steps of:

determining the disturbing vibrations by a control and regulating device using suitable sensors;

activating at least one device when previously established limiting values are exceeded by the control and regulating device such that an amplitude of the disturbing motion is completely eliminated or at least damped;

influencing at least one rotating component in a motor vehicle drive train with the at least one device such that a latter component or components is/are continuously or periodically braked in rotary motion when the disturbing vibrations occur or is/are excited to a compensatory vibration; and actuating a motor vehicle internal combustion engine by the control and regulating device such that a rotational speed of the internal combustion engine oscillates with a frequency of the disturbing vibration, but has a phase offset in relation to the frequency of the disturbing vibrations through which the amplitude of the disturbing vibration is reduced to a predetermined value.

5. The method according to claim 4, further comprising the steps of increasing a idling rotational speed during a switching travel via the control and regulating device, such that the amplitude of the disturbing vibration is reduced to the predetermined value.

6. The method according to claim 5, further comprising the steps of increasing the switching rotational speed of the internal combustion engine step by step until the amplitude of the disturbing vibration is reduced to the predetermined value.

7. A method for reducing disturbing vibrations in a motor vehicle comprising the steps of:

determining the disturbing vibrations by a control and regulating device using suitable sensors;

activating at least one device when previously established limiting values are exceeded by the control and regulating device such that an amplitude of the disturbing motion is completely eliminated or at least damped;

influencing at least one rotating component in a motor vehicle drive train with the at least one device such that a latter component or components is/are continuously or periodically braked in rotary motion when the disturbing vibrations occur or is/are excited to a compensatory vibration; and activating a second clutch of a double clutch transmission in addition to a first clutch according to torque transmission capacity, with such a vibration phase offset in relation to the disturbing vibration until an amplitude of the disturbing vibration is reduced to a predetermined value.

8. A method for reducing disturbing vibrations in a motor vehicle comprising the steps of:

determining the disturbing vibrations by a control and regulating device using suitable sensors;

activating at least one device when previously established limiting values are exceeded by the control and regulating device such that an amplitude of the disturbing motion is completely eliminated or at least damped;

influencing at least one rotating component in a motor vehicle drive train with the at least one device such that a latter component or components is/are continuously or periodically braked in rotary motion when the disturbing vibrations occur or is/are excited to a compensatory vibration; and activating a synchronization device for a non-shifted transmission step in connection with a gear box with such a vibration phase offset until the amplitude of the disturbing vibration is reduced to a predetermined value.

9. A method for reducing disturbing vibrations in a motor vehicle comprising the steps of:

determining the frequency, vibration amplitude and phase angle of a disturbing vibration by a control and regulating device using suitable sensors;

generating a compensatory vibration having substantially the same frequency and amplitude as the disturbing vibration and a vibration phase offset relative to the disturbing vibration in an abrasion-free permanent brake in a drive train of the motor vehicle;

applying the compensatory vibration to at least one rotating component in a motor vehicle drive train with the at least one device such that a latter component or components is/are continuously or periodically braked in rotary motion when the disturbing vibrations occur or is/are excited to a compensatory vibration; and determining via the control and regulating device rotational speeds of a clutch input side and a clutch output side with aid of rotational speed sensors, and ascertaining motor vehicle acceleration by the control and regulating device with aid of an acceleration sensor unit that recognizes longitudinal acceleration.

10. A device for reducing disturbing vibrations in a drive train and in a motor vehicle in which a frequency, vibration amplitude and phase angle of a disturbing vibration are received by a control and regulating device from one or more of rotational speed sensors (34, 36), and longitudinal acceleration sensors (41) connected via sensor leads (32, 33, 35), for the purpose of recording the disturbing vibration and modeling a compensatory vibration with a phase offset, the control and regulating device is connected through signal engineering via control leads (25, 26, 27, 28, 29, 30, 31 ) with actuating devices (7, 11, 15, 21, 22, 23), generating a compensatory vibration having substantially the same frequency and amplitude as the disturbing vibration and a vibration phase offset relative to the disturbing vibration in the drive train of the motor vehicle; such that the disturbing vibration is completely eliminated or at least damped in amplitude, the control and regulating device applying the compensatory vibration to at least one rotating component in the drive train such that a latter component or components is/are continuously or periodically brought into vibration or braked in rotary motion when the disturbing vibrations occur or are excited to the compensatory vibration causing a damping of the amplitude of the disturbing vibration with a superposition with the disturbing vibration; and wherein a disturbing motor vehicle longitudinal oscillation in a region of a motor vehicle seat (37) can be recorded with the vibration sensor (41).

11. A device for reducing disturbing vibrations in a drive train and in a motor vehicle in which a frequency, vibration amplitude and phase angle of a disturbing vibration are received by a control and regulating device from one or more of rotational speed sensors (34, 36), and longitudinal acceleration sensors (41) connected via sensor leads (32, 33, 35), for the purpose of recording the disturbing vibration and modeling a compensatory vibration with a phase offset, the control and regulating device is connected through signal engineering via control leads (25, 26, 27, 28, 29, 30, 31) with actuating devices (7, 11, 15, 21, 22, 23), generating a compensatory vibration having substantially the same frequency and amplitude as the disturbing vibration and a vibration phase offset relative to the disturbing vibration in the drive train of the motor vehicle; such that the disturbing vibration is completely eliminated or at least damped in amplitude, the control and regulating device applying the compensatory vibration to at least one rotating component in the drive train such that a latter component or components is/are continuously or periodically brought into vibration or braked in rotary motion when the disturbing vibrations occur or are excited to the compensatory vibration causing a damping of the amplitude of the disturbing vibration with a superposition with the disturbing vibration; and wherein the control and regulating device (24) is connected to an actuating device (7) for activating a clutch (4) via a control line (31).

12. A device for reducing disturbing vibrations in a drive train and in a motor vehicle in which a frequency, vibration amplitude and phase angle of a disturbing vibration are received by a control and regulating device from one or more of rotational speed sensors (34, 36), vibrational sensors (41) and longitudinal oscillation sensors (41) connected via sensor leads (32, 33, 35), for the purpose of recording the disturbing vibration and modeling a compensatory vibration with a phase offset, the control and regulating device is connected through signal engineering via control leads (25, 26, 27, 28, 29, 30, 31) with actuating devices (7, 11, 15, 21, 22, 23), generating a compensatory vibration having substantially the same frequency and amplitude as the disturbing vibration and a vibration phase offset relative to the disturbing vibration in the drive train of the motor vehicle; such that the disturbing vibration is completely eliminated or at least damped in amplitude, the control and regulating device applying the compensatory vibration to at least one rotating component in the drive train such that a latter component or components is/are continuously or periodically brought into vibration or braked in rotary motion when the disturbing vibrations occur or are excited to the compensatory vibration causing a damping of the amplitude of the disturbing vibration with a superposition with the disturbing vibration; and wherein the control and regulating device (24) is connected to an actuating device (15) for activating a synchronization device (10) in a gear box (8) through a control line (27).

13. A device for reducing disturbing vibrations in a drive train and in a motor vehicle in which the disturbing vibrations are determined by a control and regulating device which is connected with one or more of rotational speed sensors (34, 36) and vibration sensors (41) via sensor leads (32, 33, 35), for a purpose of recording the disturbing vibration, the control and regulating device is connected through signal engineering via control leads (25, 26, 27, 28, 29, 30, 31) with actuating devices (7, 11, 15, 21, 22, 23), the control and regulating device being activated when previously established limiting values are exceeded by the control and regulating device such that the disturbing vibration is completely eliminated or at least damped in amplitude;

the control and regulating device acts on at least one rotating component in the drive train such that a latter component or components is/are continuously or periodically brought into vibration or braked in rotary motion when the disturbing vibrations occur or are excited to a compensatory vibration causing one or more of a vibration frequency, vibration amplitude and vibration phase angle to be constructed in relation to the one or more of a frequency, amplitude and vibration phase angle of the disturbing vibration causing a damping of the amplitude of the disturbing vibration with a superposition with the disturbing vibration; and wherein the control and regulating device (24) is connected to a service brake (11) for braking a transmission input shaft (3) of a gear box (8) through a control line (26).

14. A device for reducing disturbing vibrations in a drive train and in a motor vehicle in which a frequency, vibration amplitude and phase angle of a disturbing vibration are received by a control and regulating device from one or more of rotational speed sensors (34, 36), vibrational sensors (41) and longitudinal oscillation sensors (41) connected via sensor leads (32, 33, 35), for the purpose of recording the disturbing vibration;

the control and regulating device is connected through signal engineering via control leads (25, 26, 27, 28, 29, 30, 31) with actuating devices (7, 11, 15, 21, 22, 23), generating a compensatory vibration having substantiality same frequency and amplitude as the disturbing vibration and a vibration phase offset relative to the disturbing vibration in the drive train of the motor vehicle; such that the disturbing vibration is completely eliminated or at least damped in amplitude, the control and regulating device applying the compensatory vibration to at least one rotating component in the drive train such that a latter component or components is/are continuously or periodically brought into vibration or braked in rotary motion when the disturbing vibrations occur or are excited to the compensatory vibration causing a damping of the amplitude of the disturbing vibration with a superposition with the disturbing vibration; and wherein the control and regulating device (24) is connected to an abrasion-resistant permanent brake (23) for braking motor vehicle drive shafts (18) through a control line (28).

15. A device for reducing disturbing vibrations in a drive train and in a motor vehicle in which a frequency, vibration amplitude and phase angle of a disturbing vibration are received by a control and regulating device from one or more of rotational speed sensors (34, 36), vibrational sensors (41) and longitudinal oscillation sensors (41) connected via sensor leads (32, 33, 35), for the purpose of recording the disturbing vibration;

the control and regulating device is connected through signal engineering via control leads (25, 26, 27, 28, 29, 30, 31) with actuating devices (7, 11, 15, 21, 22, 23), generating a compensatory vibration having substantially the same frequency and amplitude as the disturbing vibration and a vibration phase offset relative to the disturbing vibration in the drive train of the motor vehicle; such that the disturbing vibration is completely eliminated or at least damped in amplitude, the control and regulating device applying the compensatory vibration to at least one rotating component in the drive train such that a latter component or components is/are continuously or periodically brought into vibration or braked in rotary motion when the disturbing vibrations occur or are excited to the compensatory vibration causing a damping of the amplitude of the disturbing vibration with a superposition with the disturbing vibration; and wherein the control and regulating device (24) is connected to a power actuator on an internal combustion engine (1) of the motor vehicle via a control line (25).

* * * * *